(12) United States Patent
Brunk

(10) Patent No.: US 10,801,535 B2
(45) Date of Patent: Oct. 13, 2020

(54) SELF-PIERCING FASTENER

(71) Applicant: Penn Engineering & Manufacturing Corp., Danboro, PA (US)

(72) Inventor: Jonathan Brunk, Philadelphia, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 104 days.

(21) Appl. No.: 15/989,140

(22) Filed: May 24, 2018

(65) Prior Publication Data

US 2018/0340559 A1    Nov. 29, 2018

Related U.S. Application Data

(60) Provisional application No. 62/511,055, filed on May 25, 2017.

(51) Int. Cl.
| F16B 5/01 | (2006.01) |
| F16B 37/04 | (2006.01) |
| F16B 37/06 | (2006.01) |
| F16B 15/00 | (2006.01) |

(52) U.S. Cl.
CPC .............. *F16B 5/01* (2013.01); *F16B 37/048* (2013.01); *F16B 37/068* (2013.01); *F16B 15/0023* (2013.01); *F16B 2015/0076* (2013.01)

(58) Field of Classification Search
CPC .. F16B 5/10; F16B 37/068; F16B 2015/0076; F16B 15/0023; F16B 5/01
USPC ....... 411/179, 457, 459, 460, 493, 456, 107, 411/497, 388
See application file for complete search history.

(56) References Cited

U.S. PATENT DOCUMENTS

| 321,389 | A | * | 6/1885 | Schirmer | .............. F16B 35/042 |
| | | | | | 411/389 |
| 1,073,416 | A | * | 9/1913 | Giller et al. | ........ A47G 27/0418 |
| | | | | | 16/4 |
| 1,225,555 | A | * | 5/1917 | Achtmeyer | ............. F16D 69/04 |
| | | | | | 188/234 |
| 1,433,411 | A | * | 10/1922 | Plant | .................... A43C 15/161 |
| | | | | | 36/59 R |
| 1,438,575 | A | * | 12/1922 | Brown | ...................... E01B 9/06 |
| | | | | | 238/318 |
| 2,058,020 | A | * | 10/1936 | Jaffe | ........................ A44B 1/34 |
| | | | | | 24/114.4 |
| 2,283,814 | A | * | 5/1942 | La Place | ............. F16B 15/0015 |
| | | | | | 29/432 |
| 3,281,171 | A | | 10/1966 | Hughes | |

(Continued)

OTHER PUBLICATIONS

PCT/US18/34395 International Search Report and Written Opinion of the International Searching Authority. dated Aug. 10, 2018.

*Primary Examiner* — Flemming Saether

(74) *Attorney, Agent, or Firm* — Gregory J. Gore, Esq.

(57) ABSTRACT

A self-piercing fastener having a planar base plate with a top, a bottom, and a peripheral edge. A plurality of prongs are fixed to the peripheral edge and extend downward past the bottom of the baseplate. Each of the prongs has a central axis and an arrowhead-shaped barb fixed to a distal end. Each barb has opposed front edges extending from the tip, and opposed back edges oriented at a reverse acute angle relative to the central axis of the prong. Each barb is adapted to fixedly embed in the interior of a panel to which the fastener is affixed.

13 Claims, 3 Drawing Sheets

(56) References Cited

U.S. PATENT DOCUMENTS

| | | | |
|---|---|---|---|
| 3,757,629 A * | 9/1973 | Schneider | F16B 15/0015 |
| | | | 411/443 |
| 4,338,039 A * | 7/1982 | Demonty | E04B 1/49 |
| | | | 403/186 |
| D284,509 S * | 7/1986 | Johnson | D24/145 |
| 5,058,315 A | 10/1991 | Wagner | |
| 6,019,538 A * | 2/2000 | Whaley | B42F 13/0066 |
| | | | 402/75 |
| 6,837,659 B2 | 1/2005 | Oberkofler | |
| 8,366,364 B2 | 2/2013 | Maloney | |
| 10,247,222 B2 * | 4/2019 | Bertovic | B25B 13/50 |
| 2014/0290425 A1 | 10/2014 | Kaijala | |

* cited by examiner

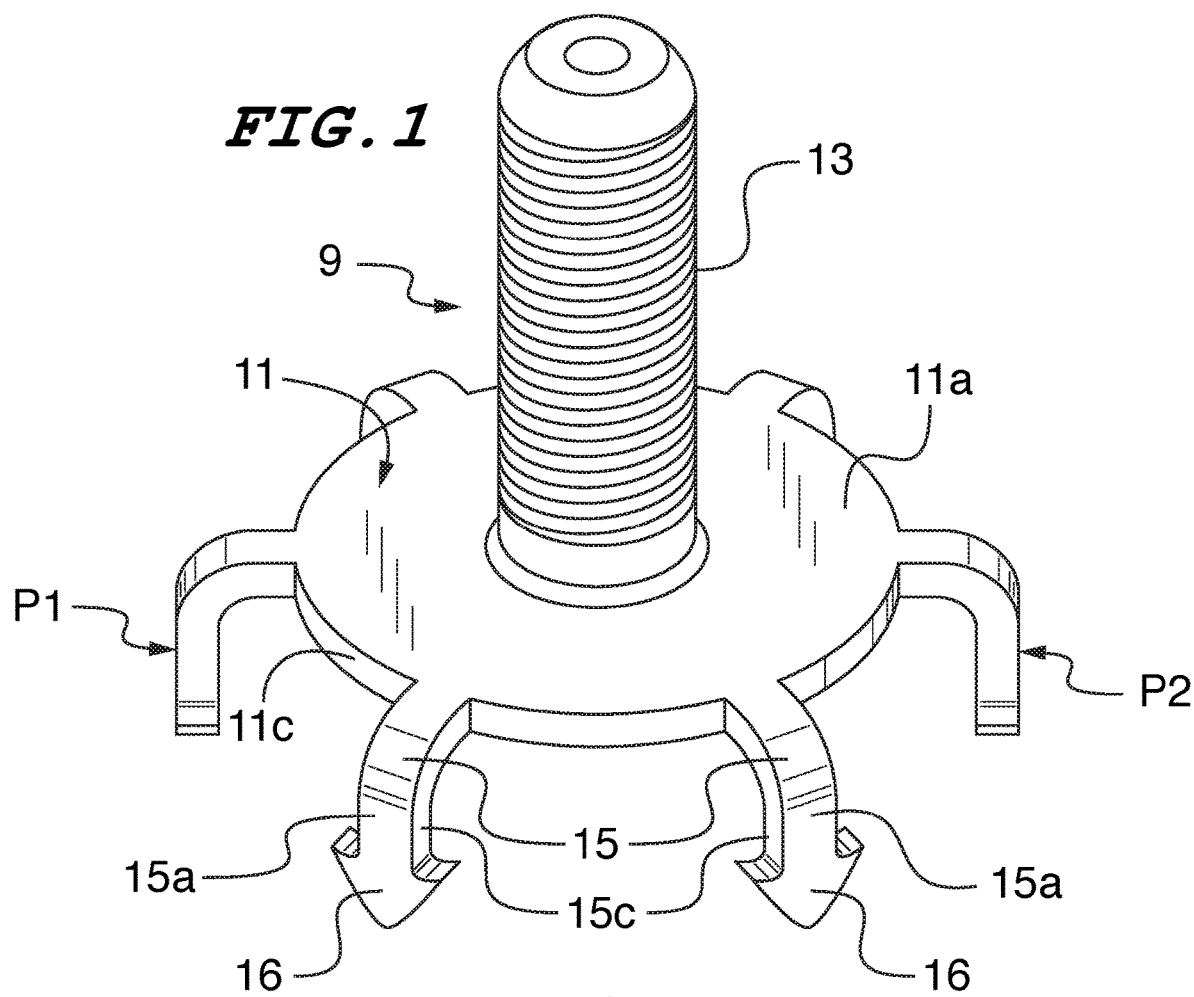
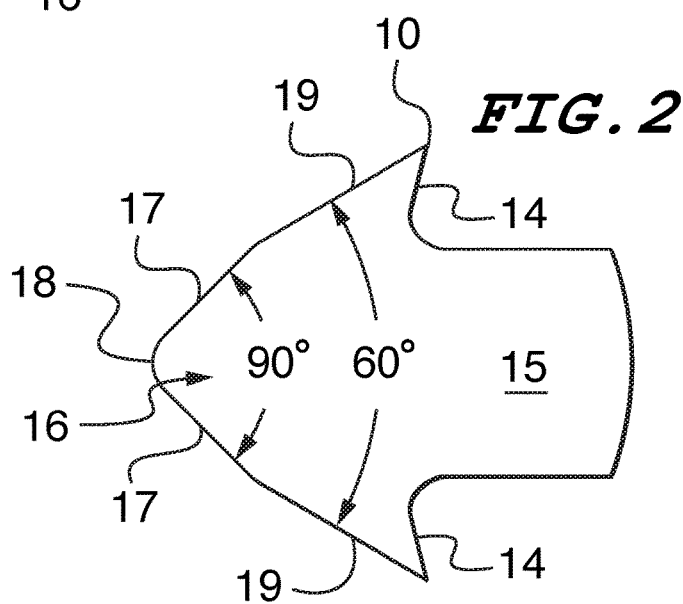

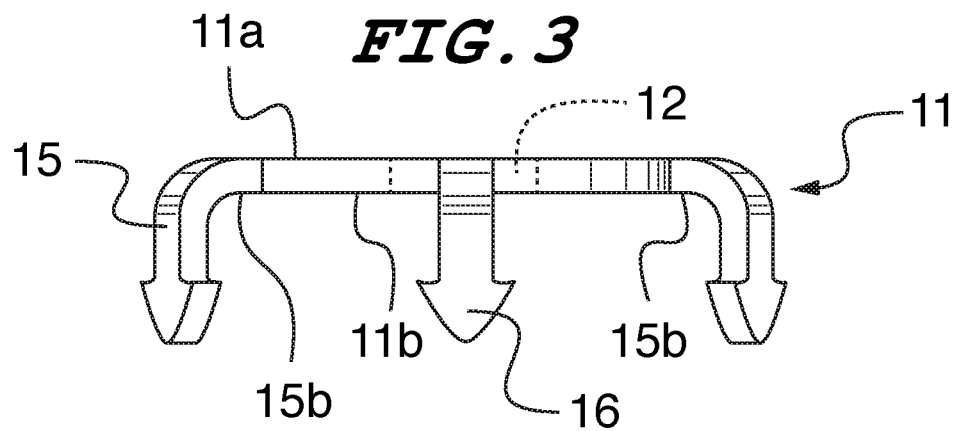
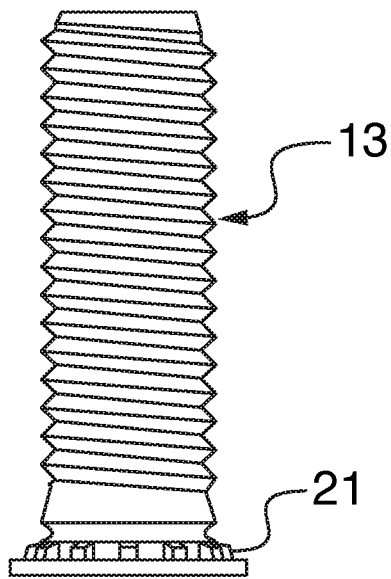
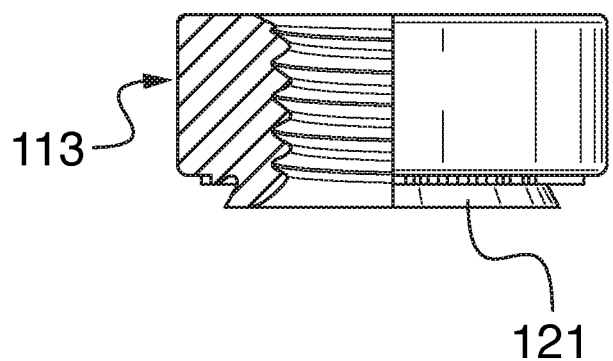

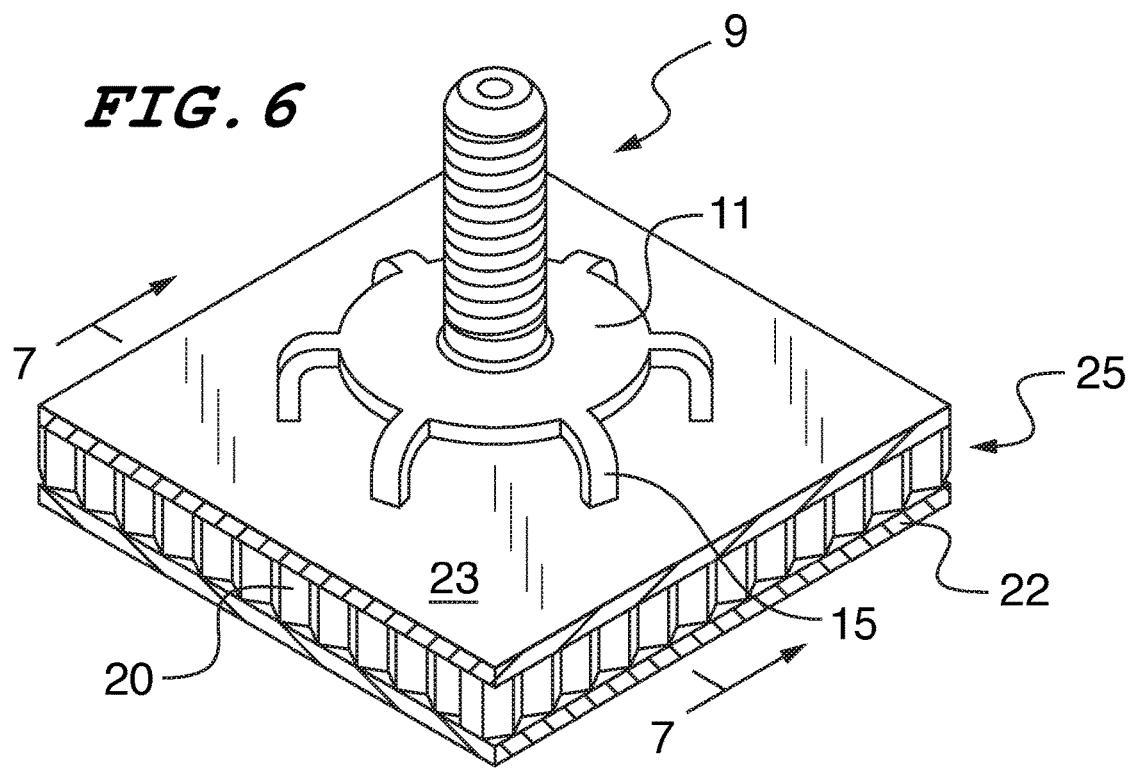
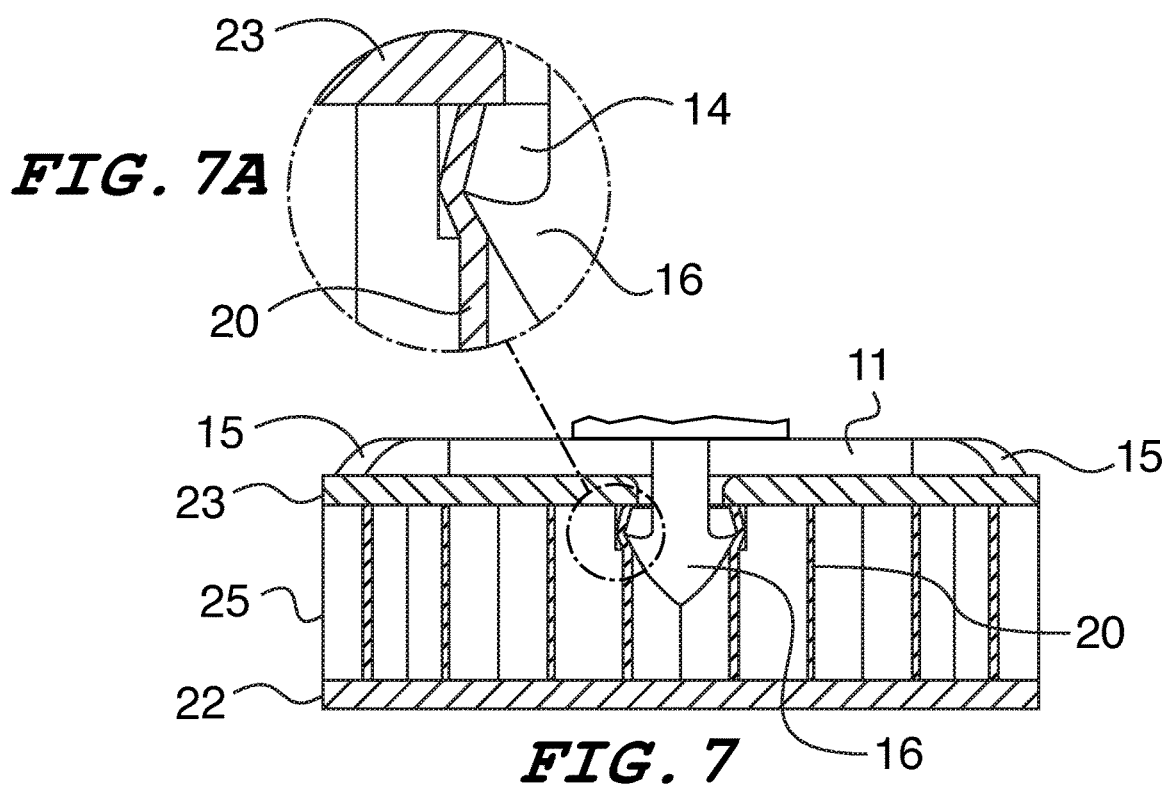

SELF-PIERCING FASTENER

CROSS-REFERENCE TO RELATED APPLICATIONS

This application is a non-provisional patent application claiming the benefit of provisional patent application 62/511,055 entitled "Self-Piercing Fastener", filed on May 25, 2017, priority from which is hereby claimed.

FIELD OF THE INVENTION

The present invention relates to self-piercing fasteners in the mechanical arts. More specifically, the invention relates to a self-piercing fastener for honeycomb type panels where the fastening element extends upwardly from the top of the honeycomb panel.

BACKGROUND OF THE INVENTION

Self-piercing fasteners are well known in the mechanical arts. These fasteners typically attach to a receiving panel by piercing the top of the panel with the fastener prongs, which may extend partially or all the way through the panel to the opposite side. Advantageously, self-piercing fasteners do not require a pre-formed hole in the receiving panel and don't require adhesives. Additionally, some self-piercing fasteners require only one application step.

Some prior art self-piercing fasteners, such as shown in U.S. Pat. No. 8,366,364 extend upwardly from the top of the panel with a lower portion of the fastener embedded into the receiving panel. The fastener portion above the panel can act as a standoff and may be internally or externally threaded. Another example of a known self-piercing fastener is disclosed in U.S. Pat. No. 3,281,171, which has a nut fastening element that extends from a mounting plate with prongs. The prongs are located around the periphery of the mounting plate and pierce the receiving panel through to the opposite side. End portions of the prongs are then bent over against the opposite side of the panel to effect panel attachment.

These prior art fasteners are suitable for planar panels of uniform density but are not suitable for non-uniform panels such as honeycomb panels, which are often preferred in applications that call for light weight and strength. Honeycomb panels are man-made, plate-like assemblies that have the geometry of a honeycomb. The geometry of these panels minimizes the required amount of structural material, and thereby minimizes weight and material cost.

The geometry of honeycomb structures can vary widely; however, most honeycomb structures have an array of cells formed between vertical walls. The cells are most often columnar and hexagonal in shape. The cells are commonly arranged in layers between two thin-panel layers that provide strength perpendicular to the cell walls and distribute loads onto the cells to form the plate-like, composite material. An example of honeycomb panels are those manufactured by Hexcel Corporation of Stamford, Conn.

In the prior art, fasteners used in honeycomb panels may be molded in the panel or mechanically attached to the panel. Both methods require preparation including drilling a hole and/or milling out the proper diameter. In one method, the fastener is adhered in the hole of to the panel by applying an adhesive and curing. In another method, the fastener is pressed in or riveted in the hole. Fasteners that are bonded on are simple to use but the drawback is that the performance of the fastener is limited by the strength of the adhesive. Therefore, it would be desirable to provide a self-piercing fastener that easily attaches in one application step to a honeycomb-type panel, and provides a strong attachment without adhesives.

SUMMARY OF THE INVENTION

The present invention relates to a self-piercing fastener that easily attaches in one pressing application step to a honeycomb-type panel, and provides a strong attachment without adhesives. The fastener has a metal baseplate that includes a plurality of downward facing prongs. Each prong has an arrowhead shaped barb with a compound taper. The barbs have edges that grip into the structure of the honeycomb panel in a unique way. As the base plate of the fastener is pressed vertically into the horizontal surface of the honeycomb-type panel, the barbs engage the vertically-spaced, internal columns of the honeycomb structure, which causes the barbs to deflect in random directions. As a result, the surfaces of the barbs, including the back edges, engage and bite into the honeycomb columns. This creates a very strong attachment of the fastener to the honeycomb panel.

The base plate includes a second attachment means for securing a second component to the top of the plate. The second fastener can have features such as internal or external threads so that another object can be affixed to the panel by way of the base plate. The attachment means for the secondary fastener is preferably a clinch attachment but may be any other suitable means.

In one preferred embodiment, the self-piercing fastener has a planar base plate with a top, a bottom, and a peripheral edge. The base plate may be substantially circular. A plurality of prongs are fixed to the peripheral edge and extend downward past the bottom of the baseplate. Each of the prongs has a central axis and an arrowhead-shaped barb fixed to a distal end. The barbs are substantially identical and equally spaced around the perimeter of the base plate. Each barb is adapted to fixedly embed in the interior of a panel to which the fastener is affixed.

Each barb has opposed front edges extending from the tip of the barb, and opposed back edges oriented at a reverse acute angle relative to the central axis of the prong. Preferably, each front edge of the barb has a compound tapered configuration. In one embodiment, the front edges of the barbs have first and second tapered region. The first regions are oriented at an included angle of approximately 90 degrees relative to one another. The second regions are oriented at an included angle of approximately 60 degrees relative to one another.

A second fastener is fixed to and extends upwardly from the top of the base plate. The second fastener may be, for example, an externally threaded stud or an internally threaded nut. In one preferred embodiment, the second fastener is affixed to the base plate by clinch attachment in a mounting hole in the base plate, whereby undercuts of the fastener receive the cold flow of metal from the base plate.

In another embodiment, the invention provides an assembly of the novel fastener and a honeycomb panel. The honeycomb panel is typically composed of a top panel, a bottom panel, and a plurality of internal cells in between the panels and defined by spaced vertical columns with side walls. The prongs of the self-piercing fastener penetrate through the top panel and the barbs engage the columns of the internal cells to rigidly affix the fastener to the top panel of the honeycomb panel. The barbs are adapted to randomly deflect radially during installation of the fastener into the top panel such that at least one opposed pair of barbs is not parallel after assembly. Preferably, the barbs do not pierce the bottom surface of the panel. The internal column walls of the panel are deflected by the barbs during installation such that corners of the back edges of the barbs resist pull-out forces by direct engagement with the deflected column walls.

BRIEF DESCRIPTION OF THE DRAWINGS

FIG. 1 is an isometric view of a self-piercing fastener in accordance with a preferred embodiment of the invention;

FIG. 2 is a side elevation of the self-piercing barb of the fastener of FIG. 1;

FIG. 3 is a side elevation of the base plate of the fastener of FIG. 1;

FIG. 4 is a side elevation of the secondary fastener attached to the base plate of FIG. 1.

FIG. 5 is a partially-sectioned, side elevation of a secondary fastener that can be attached to the base plate of FIGS. 1 and 3 in accordance with another embodiment of the invention;

FIG. 6 an isometric view of the fastener of FIG. 3 installed in a honeycomb panel in accordance with an additional embodiment of the invention;

FIG. 7 is a cross-section taken along lines 7-7 of FIG. 6; and,

FIG. 7a is an enlarged, fragmentary cross-section taken from FIG. 7.

DETAILED DESCRIPTION OF PREFERRED EMBODIMENTS

A self-piercing fastener in accordance with a preferred embodiment of the invention is shown in FIGS. 1-3 and is designated generally by reference numeral 9. The self-piercing fastener generally comprises base plate 11 having a top surface 11a, bottom surface 11b, perimeter edge 11c, and a central hole 12. A secondary fastener 13 is fixed to and extends through the hole 12 generally-perpendicularly to the top and bottom surfaces 11a, 11b of the base plate 11. In the preferred embodiment shown in FIG. 1, the secondary fastener 13 is affixed to the base plate by clinching. Material surrounding the hole 12 is cold deformed into an undercut (not shown) in the shank of the secondary fastener 13. In this embodiment, the fastener 13 is an externally-threaded stud, which projects upwardly from the top surface 11a of the plate 11.

The base plate 11 is substantially circular and has a series of prongs 15 that are fixed to and project from the perimeter edge 11c of the base plate 11. The prongs have top 15a and bottom 15b surfaces, and a perimeter surface 15c, that are continuous with the top 11a and bottom 11b surfaces, and the perimeter edge 11c, respectively, of the base plate 11. In this preferred embodiment, the prongs 15 project radially a short distance, bend about 90 degrees (relative to the plane of the top and bottom surfaces) toward the bottom surface 11b, and then project axially downwardly. In this embodiment, the prongs 15 have a lengthwise-extending central axis and have a uniform, generally-rectangular cross-section. Arrowhead-shaped barbs 16 are fixed to the distal ends of the prongs 15. Preferably, the barbs 16 are integrally formed with prongs 15. The plate 11 can be efficiently manufactured by stamping out the pattern and then bending down the prongs to the preferred 90 degree angle. The base plate 11, prongs 15 and barbs 16 of FIG. 1 are shown in isolation in FIG. 3.

Referring to FIG. 2, each of the barbs 16 has a distal tip 18, which is tapered to a point to allow self-piercing penetration into a receiving panel without the need for a prepared receiving hole. The barbs 16 have opposed front edges and opposed back edges 14, which engage the material into which the barbs penetrate. The back edges 14 extend obliquely relative to the central axis of the prongs 15, and extend from the perimeter edge 15c of the prongs 15 to a sharp corner 10. The front edges extend from the corner 10 and converge at the tip 18. The back edges 14 are oriented at a reverse (away from the tip 18) acute angle relative to the central axis of the prongs.

The front edges have a compound configuration comprising two tapered regions 17, 19, each of which tapers at a different angle relative to the central axis of the arm 15. The shape of the barb minimizes stress encountered by the material during installation. The first region 17 extends from the tip 18 to an intermediate point on the front edge, while the second region 19 extends from the intermediate point to the corner 10. The first region 17 has an included angle (the angle measured between opposed first regions) of 90 degrees. The second region 19 has an included angle (the angle measured between opposed second regions) of 60 degrees. In this preferred embodiment, the length of the first region 17 shorter than the length of the second region 19. The 60 degree taper of the second region 19 allows for a gradual installation to reduce damage to the panel. The 90 degree taper of the first region 17 keeps the barb short so that it can be used with thin, honeycomb sheets without protruding into the opposite face of the sheet. While other geometries are possible, this configuration has been found to maximize fastener performance.

The base plate 11, prongs 15 and barbs 16 of FIG. 1 are shown in isolation in FIG. 3. The prongs and barbs are preferably equally spaced around the perimeter of the base plate 11. Opposed pairs of the prongs and barbs are oriented as the mirror image of each other. In a preferred embodiment wherein the prongs are bent downwardly at an angle 90 degrees relative to the plane of the base plate 11, the opposed barbs lie in planes that are parallel to one another. For example, as best seen in FIG. 1, the fastener has 6 prongs arranged in pairs that are spaced 180 degrees apart from one another. FIG. 1 shows how the barbs of two prongs (identified as P1 and P2) lie in parallel planes.

The base plate 11 has a central mounting hole 12 that can accept a variety of secondary fasteners, which are attached by any suitable means such as clinching. FIGS. 4 and 5 show two different types of secondary fasteners that can be used with the base plate. FIG. 4 shows the externally threaded stud 13 of FIG. 1. FIG. 5 shows an internally threaded fastener 113. Each of the fasteners of FIGS. 4 and 5 has a clinch attachment means 21, 121, respectively, which engages the base plate mounting hole.

FIG. 6 shows the fastener 9 of FIG. 1 installed into a honeycomb panel 25, which has top 23 and bottom 22 panels interconnected by inner walls 20. The fastener 9 is pressed into the panel 25 until base plate 11 lies in flat contact with the top surface of the top panel 23. The large contact area of the base plate 11 resists side-to-side deflection of the secondary fastener 13.

FIGS. 7a and 7b shows how the barbs 16 engage the internal structures 20 of the honeycomb panel 25 after the fastener 9 is installed. When they penetrate the panel 25, the barbs 16 deflect the internal walls 20 of the panel 25 in random directions since the area of penetration for each barb is different within the panel 25. The barbs 16 may bend and/or twist randomly as they encounter resistance from the internal walls 20. Preferably, the length of the prongs and barbs is selected so that the barbs do not pierce the bottom panel 22. FIG. 7b more clearly shows how structural features of the barbs 16, including the corners of the back edges 14, positively resist pull-out by directly engaging the (now deflected) internal walls 20 or the top panel 23.

It will be apparent to those of skill in the art that many variations and adaptations of the disclosed embodiments are possible. Thus, it should be understood that the embodiments disclosed are to be considered as exemplary only. All variations and adaptations of those embodiments within the scope and spirit of the invention, which shall be determined by the claims and their legal equivalents.

The invention claimed is:

1. An assembly of a fastener and a honeycomb panel, comprising:
   a) a honeycomb panel having a top panel, a bottom panel, and a plurality of internal cells in between said panels and defined by spaced vertical columns with side walls; and
   b) a self-piercing fastener, comprising:
      i) a planar baseplate having a top, a bottom, and a peripheral edge; and
      ii) a plurality of prongs fixed to said peripheral edge and extending downward past the bottom of said baseplate, each of said prongs having a central axis and an arrowhead-shaped barb fixed to a distal end, each barb having opposed front edges extending from a tip of the barb, and opposed back edges oriented at a reverse acute angle relative to the central axis of said prong;
   wherein said fastener prongs penetrate through said top panel and said barbs engage the columns of said internal cells to rigidly affix the fastener to the top panel of the honeycomb panel.

2. The assembly of claim 1 wherein the baseplate is substantially circular.

3. The assembly of claim 1 wherein the arrowhead shaped barbs of the prongs each have compound tapered front edges that meet at a point.

4. The assembly of claim 3 wherein the front edges of the barbs have two tapered regions, a first region at a distal end of the barb having an included angle of approximately 90 degrees and a second contiguous region above the first region defined by a included angle of approximately 60 degrees.

5. The assembly of claim 1 wherein a second fastener extends upwardly from the top of the base plate.

6. The assembly of claim 5 wherein the second fastener is an externally threaded stud.

7. The assembly of claim 5 wherein the second fastener is an internally threaded nut.

8. The assembly of claim 5 wherein the second fastener is affixed to the base plate by clinch attachment to a receiving hole in the base plate whereby undercuts of the fastener receive the cold flow of metal from the base plate.

9. The assembly of claim 1 wherein the prongs are substantially identical and parallel to each other.

10. The assembly of claim 1 wherein the baseplate is composed of metal.

11. The assembly of claim 1 wherein the prongs are adapted for random radial deflection during installation of the fastener into the panel such that the prongs are not parallel after assembly.

12. The assembly of claim 11 wherein the barbs do not extend below the bottom surface of the panel.

13. The assembly of claim 12 wherein internal column walls of the panel are deflected by the barbs during installation of the fastener into the panel such that corners of the back sides of the barbs resist pull-out forces by direct engagement with the deflected column walls.

* * * * *